May 24, 1960 A. SCHEUNERT 2,938,080
PARTY LINE TELEPHONE SWITCHING
Filed June 21, 1956
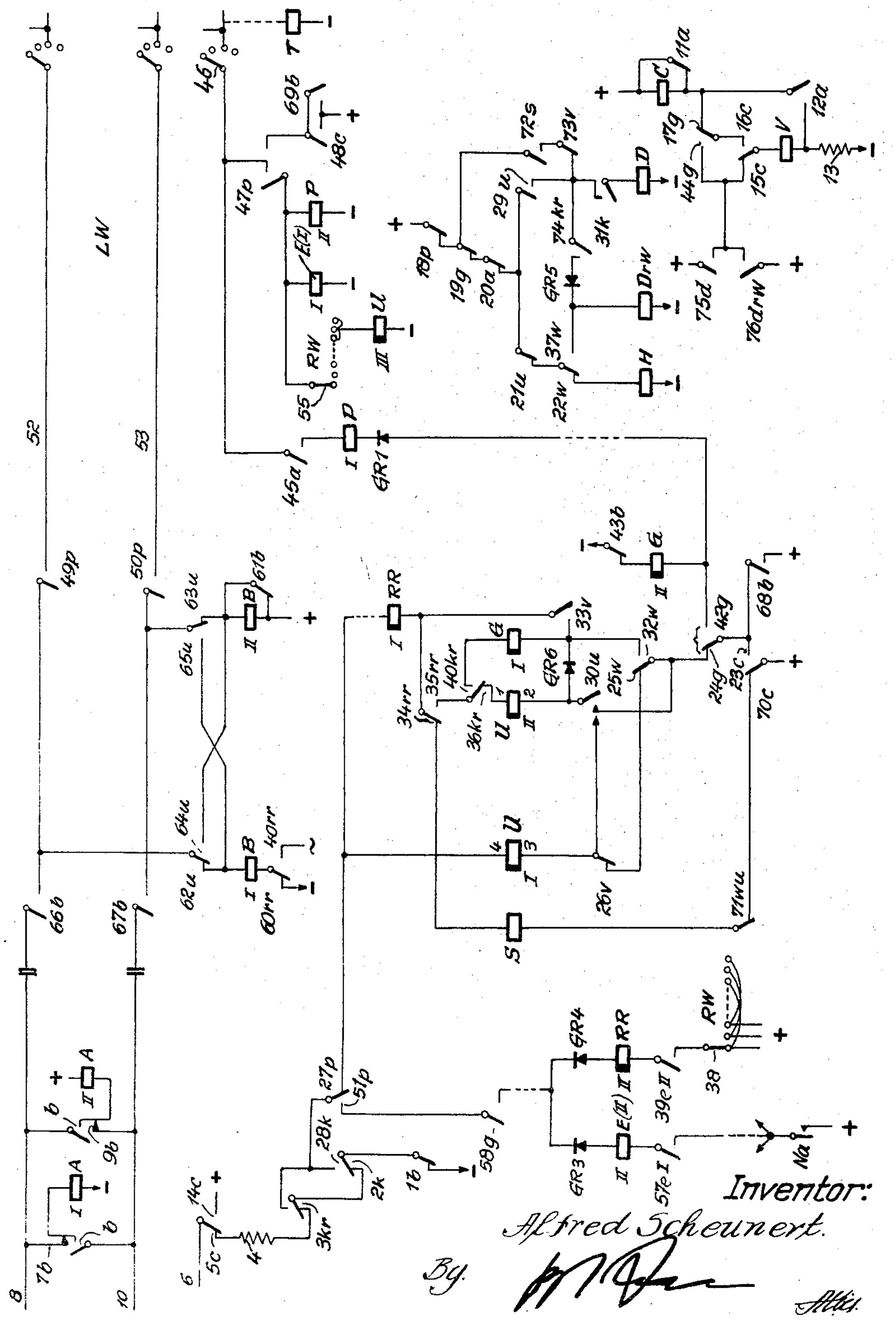
Inventor:
Alfred Scheunert
By [signature]
Atty.

United States Patent Office 2,938,080

Patented May 24, 1960

2,938,080

PARTY LINE TELEPHONE SWITCHING

Alfred Scheunert, Berlin-Siemensstadt, Germany, assignor to Siemens & Halske Aktiengesellschaft, Berlin and Munich, Germany, a corporation of Germany Filed June 21, 1956, Ser. No. 592,789

Claims priority, application Germany June 30, 1955

3 Claims. (Cl. 179—17)

This invention relates to a party line telephone switching system and is particularly concerned with connector switches having two directions of motion for selectively extending calls to party line subscribers.

Each party line is connected to the connectors only once regardless of the number of subscribers connected thereto. The selection of the ringing current provided for a desired party line subscriber or of the corresponding code signal combination may be effected by a ring control switch cooperating with the connector, and such ring control switch may be set by a special impulse series. The party line subscribers may be subdivided into two groups in order to avoid, in the case of a relatively great number of subscribers on a party line, for example, ten subscribers, the use of a corresponding number of alternating currents of different frequencies or different code signal combinations, respectively. The subscribers of one group may be called over one line conductor and those of the other group over the other line conductor.

The object of the invention is to use as few control relays as possible for the various control operations including setting of the connector first in one and then the other direction, setting the ring control switch by impulses, and switching the ringing current from one to the other line conductor to effect calling of a subscriber in one or the other group.

The invention provides a control relay cooperating in its deenergized and energized condition with switch contacts and with another relay which energizes upon receipt of impulse series, for setting the connector in its two directions of motion, such control relay thereupon closing the circuit for the drive magnet of the ring control switch and effecting connection of the ringing current to the line conductor over which a line found to be idle is to be called in accordance with the setting of the ring control swtch.

The foregoing and other objects and features will appear from the description which will be rendered below with reference to the accompanying drawing showing in schematic circuit representation an example of the invention. The drawing shows only the switching means and circuits required for an understanding of the invention.

The connector used is assumed to be a switch of the vertical-rotary type and the ring control switch is assumed to be a switch of the rotary type.

The invention will be described by tracing a call; some of the contact symbols will be briefly explained before doing so.

Contacts *2k*, *28k*, *3lk* are vertical off-normal contacts shown in normal position of the connector. These contacts are placed in alternate position when the connector is vertically off-normal.

Contacts *25w*, *32w* are rotary off-normal contacts which are actuated when the connector executes its first rotary step.

Contacts *3kr*, *36kr*, *40kr*, *74kr* are off-normal contacts of the ring control switch which are actuated when the ring control switch leaves its normal position.

Referring now to the drawing, negative potential is connected to the private conductor 6 of an idle connector by way of contacts *1b*, *2k*, *3kr*, resistor 4 and contact *5c*. After seizure of the connector by a group selector and after switching through of the line conductors 8 and 10, line relay A will energize in the loop circuit, one winding I of such line relay being connected to line conductor 8 over contact *7b* and its other winding II being connected to conductor 10 over contact *9b*. Contact *11a* is opened and *12a* is closed upon actuation of relay A, causing energization of relay C in a circuit (1) +, C, *12a*, resistor 13, —

Contact *5c* is opened and contact *14c* is closed responsive to actuation of relay C, placing positive potential on the private conductor 6 to mark it as being busy. Contact *15c* is opened and contact *16c* closed to close a circuit for relay V which however remains at normal, its winding being short-circuited by contact *12a*.

Relay A deenergizes impulsewise in step with the impulses of the impulse series received from the calling party for the vertical setting of the connector, and relay V is operatively connected in a circuit (2) +, *11a*, *17g*, *16c*, V, resistor 13, —

The vertical stepping magnet H is now stepped in a circuit (3) +, *18p*, *19g*, *20a*, *21u*, *22w*, H, —

Relays V and C remain energized during the receipt of the corresponding impulse series. Upon conclusion of the such impulse series, relay V deenergizes due to the shunt over contact *12a* which persists for an interval. Relay U is now energized in a circuit (4) +, *23c*, *24g*, *25w*, *26v*, winding I of U, *27p*, *28k*, *1b*, —

Upon energizing, relay U opens its contact *21u* and closes contact *29u*. The next impulse series does not affect the vertical magnet H but the rotary stepping magnet D. Closure of the contacts *30u* prepares further control operations, among others, contacts *25w* and *26v* are bridged. Relay V energizes again upon receipt of the second impulse series which is effective for actuating the rotary magnet of the connector. The rotary stepping magnet D is actuated in a circuit (5) +, *18p*, *19g*, *20a*, *29u*, *31k*, D, —

Contact *33v* being closed, relay RR will energize over its winding I in a circuit (6) +, *23c*, *24g*, *32w*, *33v*, IRR, *27p*, *28k*, *1b*, —

Incident to the first rotary step of the connector, the rotary off-normal contact *25w* will open and contact *32w* will close.

Of the contacts actuated by relay RR, the closure of contacts *35rr* is of immediate interest. Winding II of relay U, which is in opposition to the winding I, as indicated by the numerals 1, 2, cannot become effective during the receipt of the impulses because it is short-circuited in a circuit (7) IIU(1), *36kr*, *35rr*, *33v*, GR6, IIU(2)

The short-circuit (circuit 7) is interrupted upon conclusion of the impulse series and restoration of relay V and opening of contacts *33v*. The winding IIU is connected in the circuit "6," such winding being in series with winding IRR. Relay U deenergizes and restores its contacts to the illustrated position. Relay RR also deenergizes, because after opening of contact 30$u$ there is connected in its circuit the rectified GR6. The rotary stepping magnet D$rw$ of the ring control switch RW is now subject to control by contact 20$a$, due to closure of contact 21$u$, rotary off-normal contact 37$w$ being closed. The next (third) impulse series actuates the rotary magnet D$rw$. The rotary stepping magnet D of the connector cannot be affected because contact 29$u$ is open. Relay V operates again upon receipt of the corresponding impulse series and the ring control switch RW is set to the position in which the code signal combination designating the selected subscriber is connected by way of the wiper 38. Instead of different code signal combinations, there may be used alternating ringing current of different frequencies. The wiper 38 of the ring control switch would in such case not lie on contact 39$e$II but on contact 40$rr$, while positive potential would be connected in certain time sequence for the energization of the ringing relay RR. The illustrated arrangement assuming different code signal combinations will now be described.

After the first step of the ring control switch, contacts $kr$ are actuated, contact 36$kr$ opening and contact 40$kr$ closing. Relay RR energizes in the circuit "6" responsive to energization of relay V and closes its contact 35$rr$. Relay G cannot energize so long as contact 33$v$ is closed because its winding is short-circuited. Upon conclusion of the impulse series and deenergization of relay V as well as opening of contact 33$v$, the winding IG is placed in series with winding IRR and relay G energizes in a circuit (8) +, 23$c$, 24$g$, 32$w$, IG, 40$kr$, 35$rr$, IRR, 27$p$, 28$k$, 1$b$, —

Relay G closes for itself a holding circuit (9) +, 23$e$, 42$g$, IIG, 43$b$, —

Contact 24$g$ opens the circuit "8." Opening of contacts 17$g$ and closing of contacts 44$g$ causes switching over of relay V and secures subsequently upon release of the connection in cooperation with the rotary stepping magnets D and D$rw$, the release of the connector and the ring control switch.

At contact 42$g$ is closed the test circuit

(10) +, 23$c$, 42$g$, GR1, IP, 45$a$, 46, $T$, —

Relay P energizes if the called line is idle. Closure of contacts 47$p$ places the busy potential from contact 48$c$ on the wiper 46. The holding winding IIP is at the same time connected. Contacts 18$p$ and 27$p$ are opened. The line conductors are switched through at contacts 49$p$ and 50$p$. Closure of contact 51$p$ prepares for the transmission of ringing current.

In order to avoid in the case of 10 subscribers on a party line the use of 10 ringing current sources with 10 different frequencies of 10 different code signal combinations, the subscribers are subdivided into two groups. The ringing of each subscriber T$n$1 to T$n$5 is effected over line conductor 52 and the ringing of each subscriber T$n$6 to T$n$10 over line conductor 53. Relay U determines to which line conductor the code signal combination is to be connected, relay U, as will be remembered, also controlling in its different switching positions the actuation of the vertical magnet H and of the rotary magnet D of the connector and also of the rotary magnet of the ring control switch RW. Relay U is deenergized during the setting of the ring control switch. When the ring control switch is set in one of the switching positions 1–5, the code signal applying will be connected to the line conductor 52. Setting of the ring control switch in one of the switching positions 6–10 will cause connection of the code signal to line conductor 53.

It shall be assumed first that the ring control switch is in one of the switching positions 1–5. The wiper 55 is in such case in engagement with one of the unconnected contacts.

Relay E will be energized upon closure of the contact 47$p$ in a circuit

(11) +, 48$c$, 47$p$, IE(I), —

Relay E is operable in stages. Current flow through its winding I (right hand end-center of drawing) causes operation of relay E in its first stage as indicated by (I) following the letter E. Only contact 57$e$I (left hand bottom of drawing) will be closed in this first stage. In order to fully transmit the code signal allotted to the selected called subscriber, the ringing relay must be placed under control of the ringing device prior to the start of a code series. This is effected by a current impulse released by the ringing device, for example, by a cam controlled contact N$a$, at the end of each code series. This current impulse effects operation of the relay E to assume its second stage position, in a circuit

(12) +, N$a$, 57$e$I, IIE(II), GR3, 58$g$, 51$p$, 28$k$, 1$b$, —

Upon closure of contact 39$e$II, ringing relay RR will be energized over its winding II in accordance with the code signal series of the called subscriber. Relay RR opens its contact 60$rr$ and connects the proper ringing current source at its contact 40$rr$. Ringing current flows over line conductor 52 and back over line conductor 53 to ground by way of contacts 63$u$ and 61$b$, the latter contact short-circuiting winding II of relay B and preventing actuation thereof.

If the ringing control switch is set by corresponding impulse series to one of the positions 6–10, the wiper 55 will be in engagement with one of the interconnected contacts and, responsive to energization of relay P, relay U will be actuated in addition to relay E, in a circuit

(13) +, 48$c$, 47$p$, 55, IIIU, —

Upon actuating, relay U open its contacts 62$u$, 63$u$ and closes its contacts 64$u$, 65$u$, thereby switching the contacts 60$rr$/40$rr$ from the line conductor 52 to line conductor 53.

Relay B energizes over the called subscriber's loop-circuit if the called party answers during a ringing pause. Relay B opens its contact 61$b$, removing the shunt across its winding II, extends the line conductors by closing contacts 66$b$ and 67$b$, and closes its contacts 68$b$ and 69$b$ disposed respectively in parallel to contacts 23$c$ and 48$c$. At contact 43$b$, relay B interrupts the circuit for the holding winding II of relay G. Opening of contact 1$b$ and subsequently of contact 58$g$ prevents renewed operation of relay RR.

The release of the connector and the ringing control switch is effected responsive to replacement of the receivers at both subscriber stations. Assuming that the calling subscriber hangs up first, relay A will restore, and thereafter C, because its winding will be shunted by contact 11$a$. Relay V will briefly energize which is, however, without consequence. At contact 70$c$, a circuit will be prepared for relay S. When the called party hangs up, relay B will restore, thereby freeing the corresponding party line, positive busy potential being now disconnected from the wiper 46 at contacts 48$c$ and 69$b$. Relays P, E, and U which is actuated only in connection with certain calls, restore. Relay S energizes in a circuit

(14) +, 70$c$, 71$wu$, S, 34$rr$, IRR, 27$p$, 28$k$, 1$b$, —

The contact 71$wu$ is closed so long as wipers of the switch are in engagement with bank contacts; it opens when the wipers leave the bank contacts. Relay RR cannot energize in the circuit "14" due to the high resistance of the winding of relay S. Upon closure of contact 72$s$, the rotary stepping magnet D of the connector and the drive magnet D$rw$ of the rotary switch will be connected in a circuit

(15) +, 18$p$, 72$s$, 73$v$, $\frac{31k}{74kr}$, $\frac{\text{D}}{\text{GR5, D}rw}$, —

Relay V is now connected over contacts 75 and 76_drw_, in a circuit $$(16) \qquad +, \frac{\mathbf{75}d}{\mathbf{76}drw}, \mathbf{15}c, \text{V}, \mathbf{13}, -$$

The circuit "15" is interrupted at contact 73_v_ and both magnets D and D_rw_ restore. Circuit "16" is opened. The alternate closing and opening of the circuits "15" and "16" persists until both switches are in home position and off-normal contacts 74_kr_ and 31_k_ are accordingly open, thus preventing further operation. The idle potential is reconnected to the incoming private conductor 6 at off-normal contacts 3_kr_ and 2_k_.

Changes may be made within the scope and spirit of the appended claims.

I claim:

1. In a telephone system having party lines and, a connector switch comprising wipers for selectively extending calls from calling stations to subscribers on said party lines, said connector switch having two stepping magnets which are responsive to impulse series received from a calling station for setting said wipers in two directions of motion in extending a call to a party line subscriber and having a ring control switch comprising a drive magnet individual thereto and having circuit means for setting said ring control switch in accordance with an impulse series received and denoting a desired party line subscriber and further having a relay which is operatively actuated during the receipt of impulse series; a control relay, circuit means including off-normal contacts of said connector and contacts controlled by said first named relay for governing the operation of said control relay, said control relay having the triple function of governing, first, the operation of circuit means for operating said two stepping magnets of said connector switch, second, of governing the operation of said ring control switch, and, third, of governing circuit means for connecting ringing current to one or the other line conductor of the corresponding party line.

2. A circuit arrangement according to claim 1, wherein said control relay comprises two opposing windings, circuit means for energizing said relay over one of said windings to effect control of the setting operations of said two drive magnets, and circuit means, controlled by said first named relay upon deenergization thereof responsive to setting said connector switch, for energizing said other opposing winding to restore said control relay to normal.

3. A circuit arrangement according to claim 2, comprising a third winding for said control relay, circuit means controlled by said ring control switch in predetermined positions thereof for energizing said control relay over said third winding, and circuit means thereupon controlled by said control relay for switching ringing current from one to the other line conductor.

References Cited in the file of this patent

UNITED STATES PATENTS

| | | |
|---|---|---|
| 2,576,216 | Dorr | Nov. 27, 1951 |
| 2,654,001 | Lomax | Sept. 29, 1953 |
| 2,773,126 | Lomax | Dec. 4, 1956 |
| 2,788,394 | Barrow et al. | Apr. 9, 1957 |
| 2,821,574 | Sass et al. | Jan. 28, 1958 |